(12) United States Patent
Blom et al.

(10) Patent No.: US 11,385,847 B2
(45) Date of Patent: Jul. 12, 2022

(54) USER INTERFACE WITH SUMMARY WINDOW

(71) Applicant: Canon Production Printing Holding B.V., Venlo (NL)

(72) Inventors: Jeroen Blom, Venlo (NL); Pascal A. M. S. Hagens, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 0 days.

(21) Appl. No.: 17/139,438

(22) Filed: Dec. 31, 2020

(65) Prior Publication Data

US 2021/0216260 A1 Jul. 15, 2021

(30) Foreign Application Priority Data

Jan. 14, 2020 (EP) .................................... 20151693

(51) Int. Cl.
*G06F 3/12* (2006.01)
*G06F 3/0482* (2013.01)
*G06F 3/0486* (2013.01)

(52) U.S. Cl.
CPC .......... *G06F 3/1259* (2013.01); *G06F 3/0482* (2013.01); *G06F 3/0486* (2013.01); *G06F 3/1204* (2013.01); *G06F 3/1205* (2013.01); *G06F 3/126* (2013.01); *G06F 3/1207* (2013.01); *G06F 3/1253* (2013.01); *G06F 3/12* (2013.01); *G06F 2203/04803* (2013.01)

(58) Field of Classification Search
CPC .... G06F 3/1259; G06F 3/0482; G06F 3/0486; G06F 3/1204; G06F 3/1205; G06F 3/1207; G06F 3/1253; G06F 3/126; G06F 2203/04803; G06F 3/1203; G06F 3/1256; G06F 3/1285; G06F 3/04886; G06F 3/12

USPC ........................................................ 358/1.15
See application file for complete search history.

(56) References Cited

U.S. PATENT DOCUMENTS

| | | | | |
|---|---|---|---|---|
| 5,682,326 A | * | 10/1997 | Klingler | G11B 27/34 715/202 |
| 10,248,369 B2 | * | 4/2019 | Krikke | G06F 3/1263 |
| 10,366,151 B1 | * | 7/2019 | Mertens | G06F 40/166 |

(Continued)

FOREIGN PATENT DOCUMENTS

EP 3 091 431 A1 11/2016

OTHER PUBLICATIONS

Search Report issued in European Patent Application No. 20 15 1693, dated Jun. 18, 2020.

*Primary Examiner* — Darryl V Dottin
(74) *Attorney, Agent, or Firm* — Birch, Stewart, Kolasch & Birch, LLP

(57) ABSTRACT

A user interface includes a display and a controller configured for displaying image frames with variable contents. Each image frame includes a selection of display items. At least some of the image frames include a summary window displayed at a fixed location on a screen of the display. The controller is configured to assign a summary attribute to at least some of the display items and to display these display items in the summary window. The controller has an editing function allowing a user to change a configuration of the image frames. The editing function includes a function allowing the user to assign the summary attribute to a display item by dragging the display item into the summary window.

8 Claims, 7 Drawing Sheets

(56) References Cited

U.S. PATENT DOCUMENTS

2005/0088668 A1\* 4/2005 Sesek .................... G06F 3/1263
358/527
2020/0242433 A1\* 7/2020 Daniel ................. G06K 15/005

\* cited by examiner

| | completed | | processed | waiting | |
|---|---|---|---|---|---|
| ... | Job-No. -2 | Job-No. -1 | Job-No. 0 | Job-No. 1 | Job-No. 2 | ...

| ID | content-determining variable(s) x | content C(x) | summary attribute [yes/no/ only for x=1] |
|---|---|---|---|
| 38 | 40 | 42 | 42 |

USER INTERFACE WITH SUMMARY WINDOW

TECHNICAL FIELD OF THE INVENTION

The invention relates to a user interface comprising a display and a controller configured for displaying image frames with variable contents, wherein each image frame includes a selection of display items, at least some of the image frames include a summary window displayed at a fixed location on a screen of the display, the controller is configured to assign a summary attribute to at least some of the display items and to display these display items in the summary window, and the controller has an editing function allowing a user to change a configuration of the image frames.

More particularly, the invention relates to a user interface for a printing system. In that case, the display items may for example comprise information on the current status of the printing system, the supply status of consumables such as media and marking material, and more or less detailed information on print jobs that have been processed and/or are waiting in a print queue for being processed. The user may switch between different image frames in order to retrieve the information she is presently interested in. The display items to be shown in the different image frames may change dynamically in accordance with changes in the status of the printing system. In some cases, for example when an important alarm message has to be conferred to the user, the controller of the user interface may be configured to switch from one image frame to another even without intervention of the user.

The display of a conventional user interface may for example be mounted on a body of a printer and may have a relatively large display area suitable for displaying a larger number of display items at a time.

BACKGROUND OF THE INVENTION

Today, a user interface of a printing system or any other equipment is frequently implemented as an application (App) on a smartphone or tablet computer which has a touch screen display with only a relatively small display area, so that the user is required to switch between different image frames more frequently.

In a known printing system of the applicant, the user interface has a summary window that is permanently displayed at a fixed location on the display screen and is reserved for displaying a summary of the information that is considered to be most relevant for the user. In the controller of the user interface, a summary attribute may be assigned to each display item that may potentially be displayed in the summary window, the summary attribute being a logical variable which may have the values "yes" or "no", and the item is displayed in the summary window only if the summary attribute is "yes". Optionally, the controller may be configured to toggle the summary attributes for certain display items on and off depending upon the current status of the printing system.

It is an object of the invention to provide a user interface that is more convenient for a user.

SUMMARY OF THE INVENTION

In the user interface according to the invention, in order to achieve this object, the editing function includes a function allowing the user to assign the summary attribute to a display item by dragging the display item into the summary window.

In certain cases, a user may desire that certain display items are permanently visible on the screen even if the controller or the user herself switch between different image frames. For example, if the printing system includes a dual flatbed printer on which one print job may be processed on a first section of the flatbed while the user is busy with making preparations for a subsequent print job on another section of the flatbed, the user may desire to be able to permanently see a preview of the print job for which she is preparing the printer. In such cases, once the user has switched to an image frame that shows the display item she is interested in, the user may simply activate this display item on the screen and move it into the summary window by drag and drop, and as a result, the summary attribute will be assigned to this item and, consequently, this item will remain visible in the summary window permanently, even if the user switches to another image frame.

More specific optional features of the invention are indicated in the depending claims.

In a dynamic user interface, the contents of some display items may change dynamically in accordance with changes in the status of the system. In that case, the controller stores the contents to be displayed in a given display item in the form of a function of a contents-determining variable that reflects the status of the system. Then, if the summary attribute is assigned to that display item, the effect may be that the item is permanently shown in the summary window but the contents thereof change dynamically in accordance with the status of the system.

In one embodiment of the invention, however, it is also possible to assign the summary attribute not to the display item as a whole but to one particular contents-determining variable for that item. Then, the contents of the item that is permanently shown in the summary window will be "frozen" to the particular value of the variable to which the summary attribute has been assigned. For example, if the display item relates to some particular information on a print job, e.g. a preview of the print job, the contents-determining variable may be a number that indicates the progress of the print job in the print queue. When the print jobs in the queue are processed one after the other, the numbers will be counted down as the jobs approach the head of the print queue. For example, the number "1" may designate the print job that is the next to be processed. Then, if the summary attribute is assigned to the value "1" of this variable, the information shown in the summary window will always relate to the print job that is the next to be processed.

The controller may be configured to assign the summary attribute to the display item as a whole for some display items and to assign the attribute only to the contents-determining variable for other display items. In some embodiments, the choice between these two options may also be left to the user.

DETAILED DESCRIPTION OF THE EMBODIMENTS

Embodiment examples will now be described in conjunction with the drawings, wherein.

Figure 1:
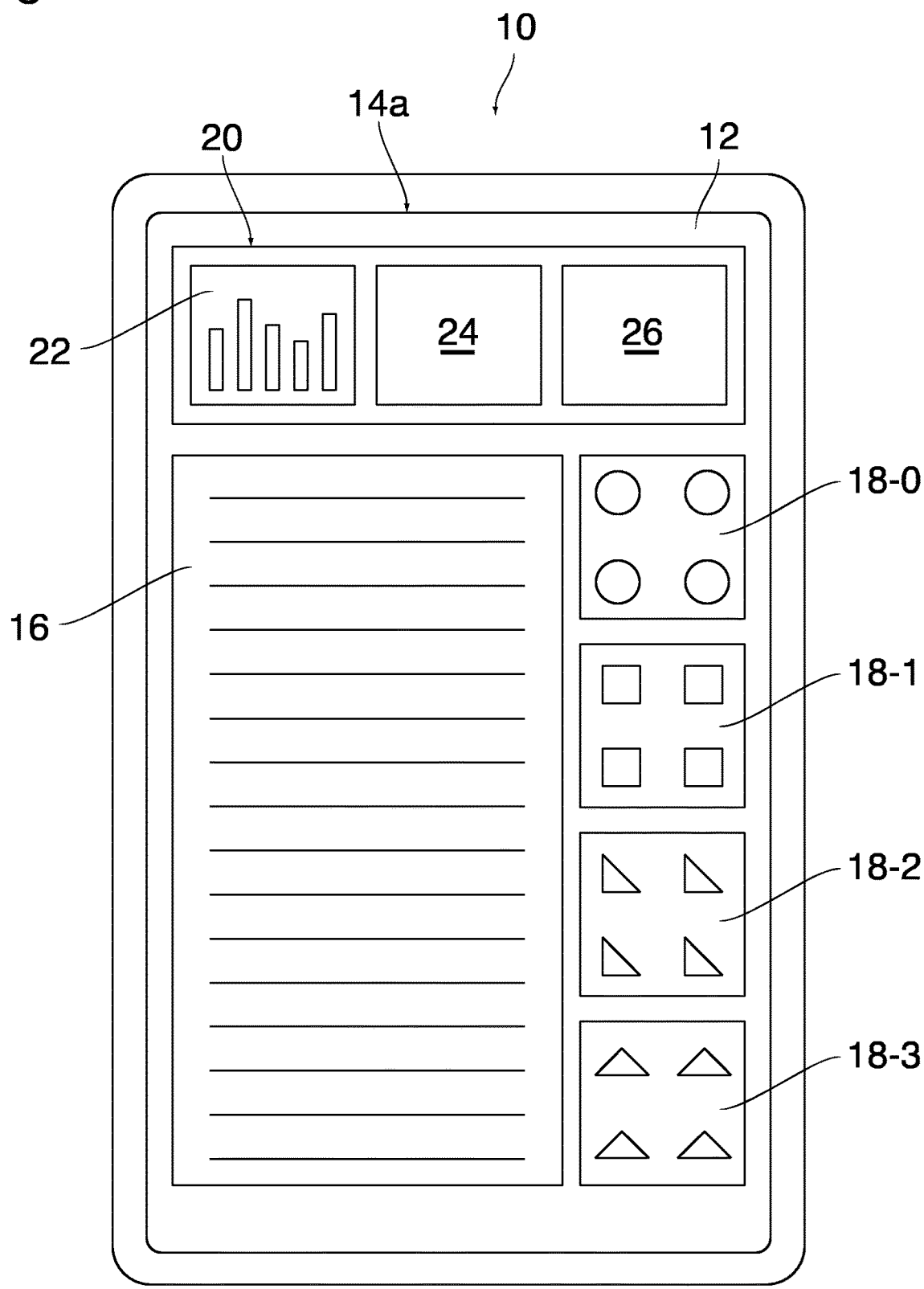
FIG. 1 is a view of a user interface implemented on a smartphone.

As is shown in FIG. 1, a user interface has been implemented on a smartphone 10 which has a display 12 that is constituted by a touch screen and displays an image frame 14a.

In the example shown, it is assumed that the user interface serves for controlling a printing system, e.g. a dual flatbed ink jet printer. The image frame 14a includes a number of display items 16 and 18-0 to 18-3. It may be assumed that the display item 16 is a list of print jobs waiting in a print queue to be processed on the printer. The display items 18-0 to 18-3 may be previews of the images or panels to be printed in the respective print jobs. More precisely, display item 18-0 is a preview of the print job that is currently being processed, display item 18-1 is a preview of a subsequent print job that will be the next to be processed, and display items 18-2 and 18-3 relate to the next two print jobs in the print queue.

The image frame 14a further includes a summary window 20 which occupies the top part of the frame and, in this example, comprises three sub-windows 22, 24 and 26. The sub-window 22 displays a bar diagram representing the filling states of ink tanks of the printer, which ink tanks contain inks of different colors. The sub-windows 24 and 26 are empty in this example.

As is generally known in the art, the user may use gestures on the touch screen display 12 for editing the displayed contents. For example, the user may obtain an enlarged image of an individual display item such as the item 18-0 by double-tapping on that item. Similarly, the user may switch to another image frame, e.g. by wiping leftwards over the display. A wiping movement in the opposite direction may call-up a main menu tree showing a hierarchy of image frames among which the user may select.

Figure 2:
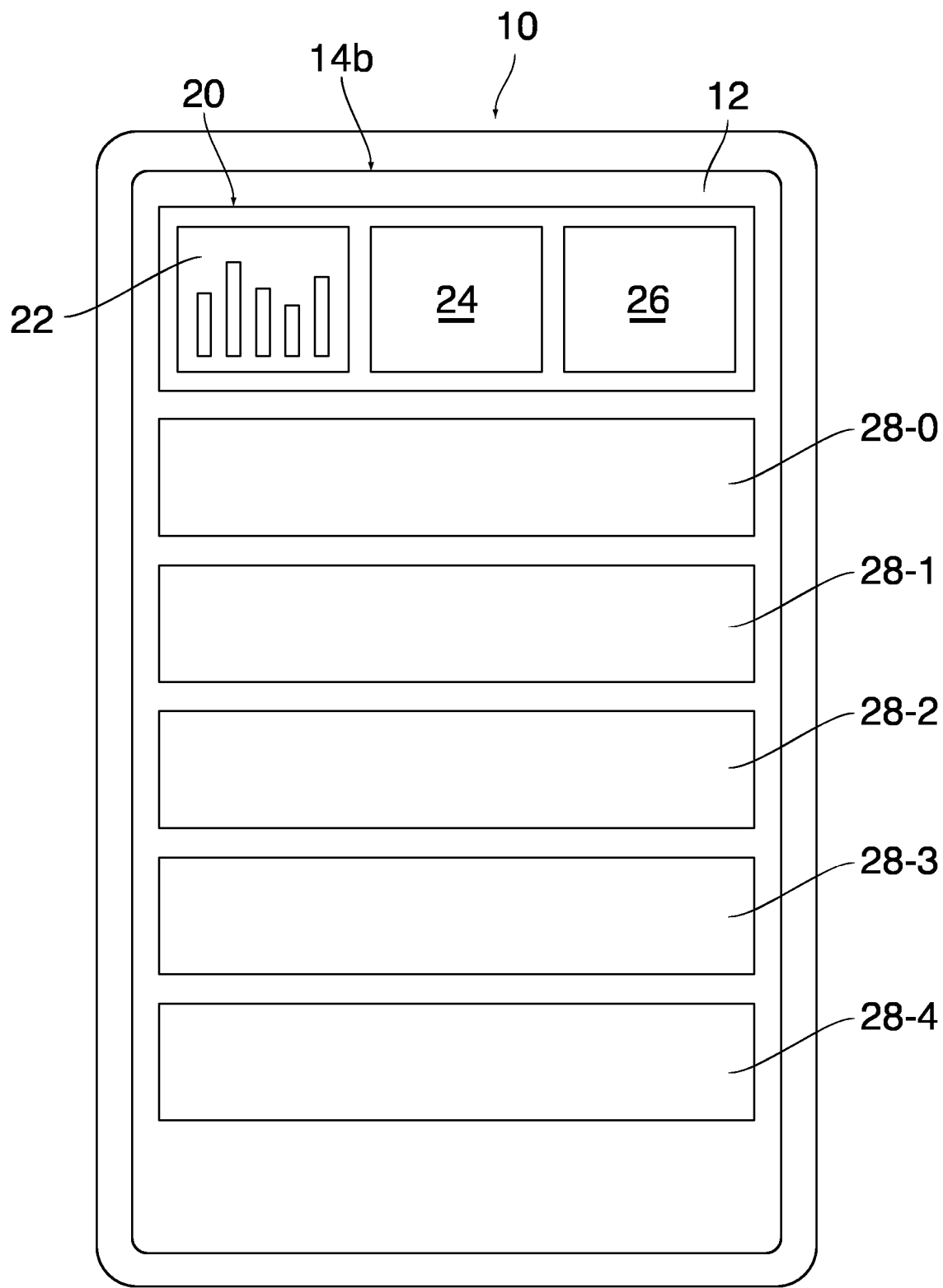
FIG. 2 shows the user interface displaying another image frame.

FIG. 2 illustrates a condition in which the user has selected another image frame 14b that includes other display items 28-0 to 28-4. For example, the display items 28-0 to 28-4 may contain detailed description of media properties of media to be used in the successive print jobs.

It will be observed that the image frame 14b includes the same summary window 20 as the image frame 14a. In general, the summary window 20 is always shown at the same position on the screen, regardless of which image frame has been selected. This enables the user to easily and quickly capture the relevant information shown in the summary window even when the user navigates through the various display frames.

It shall now be assumed that the user wants to prepare a section of the flatbed of the printer for a print job that is the next to be processed as soon as the present print job has been completed. The user may therefore find it desirable to have the display item 18-1 (FIG. 1), which display item shows a preview of the print job that the user is preparing, is constantly visible on the screen regardless of which image frame has been selected.

Figure 3:
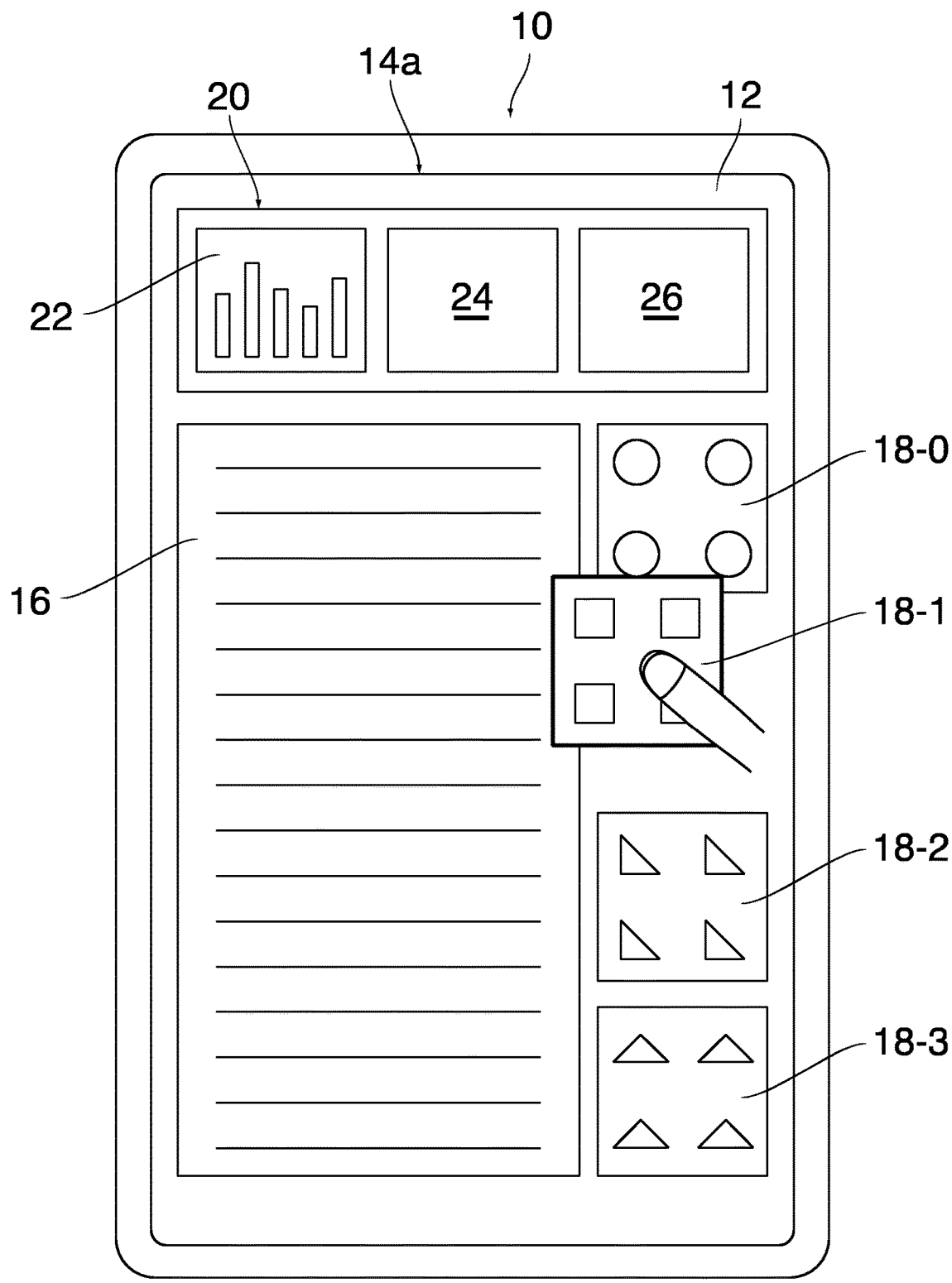
FIGS. 3 and 4 illustrate an editing operation for the user interface.
Figure 4:
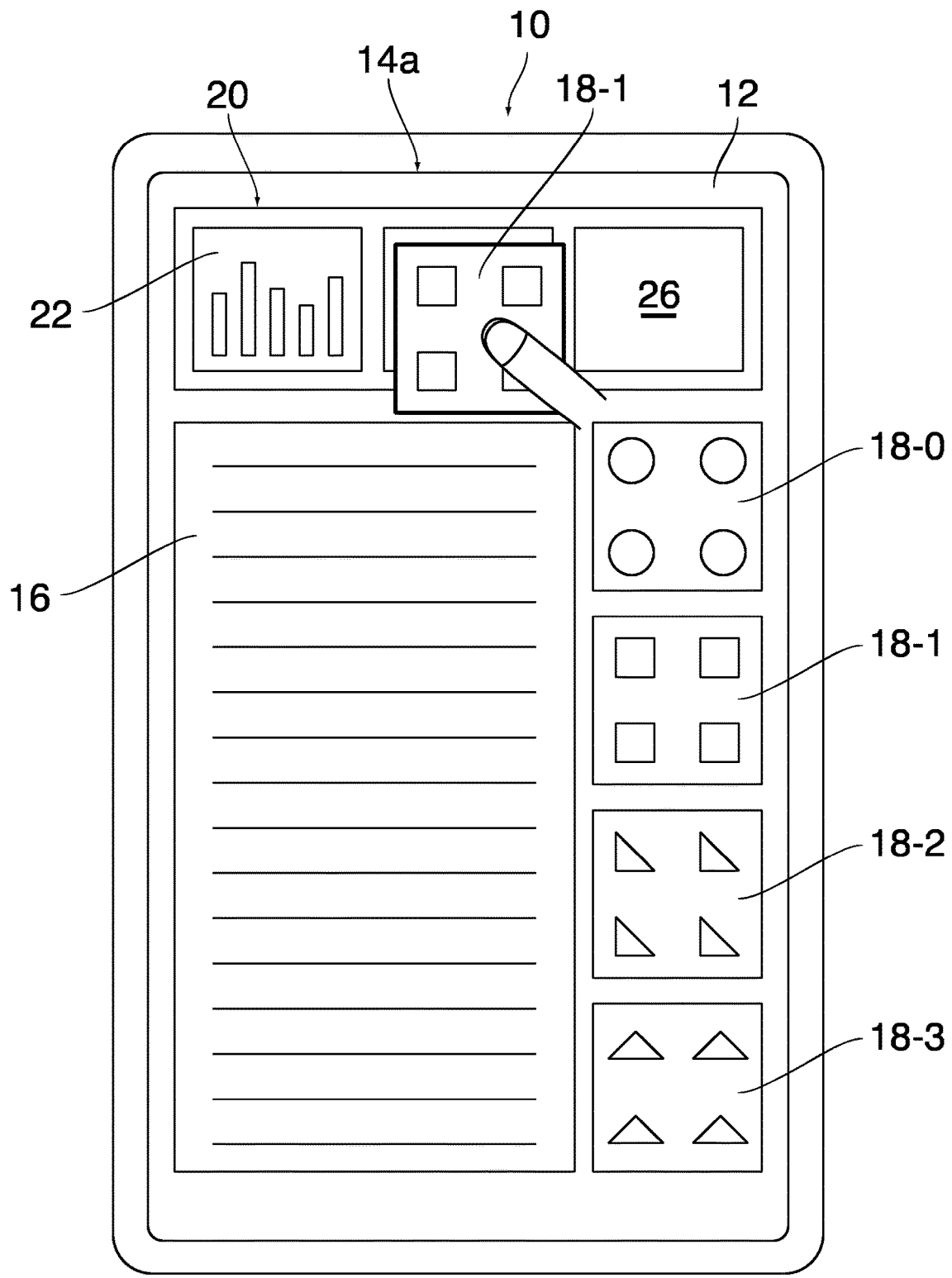

To that end, the user may move the display item 18-1 into the summary window 20, as has been shown in FIGS. 3 and 4. In FIG. 3, the user has activated the display item 18-1 by tapping with her finger on the display item, and she then moves the item over the screen by moving a finger. In FIG. 4, the user has dragged the display item 18-1 onto the empty sub-window 24 of the summary window 20. Then, when the user lifts her finger, the display item 18-1 will be locked in the sub-window 24, as has been shown in FIG. 5. Optionally, the display item may automatically be scaled so as to fit into the sub-window. Further, as has been shown in FIG. 4, another copy of the display item 18-1 may be shown in the original position of that display item.

Figure 5:
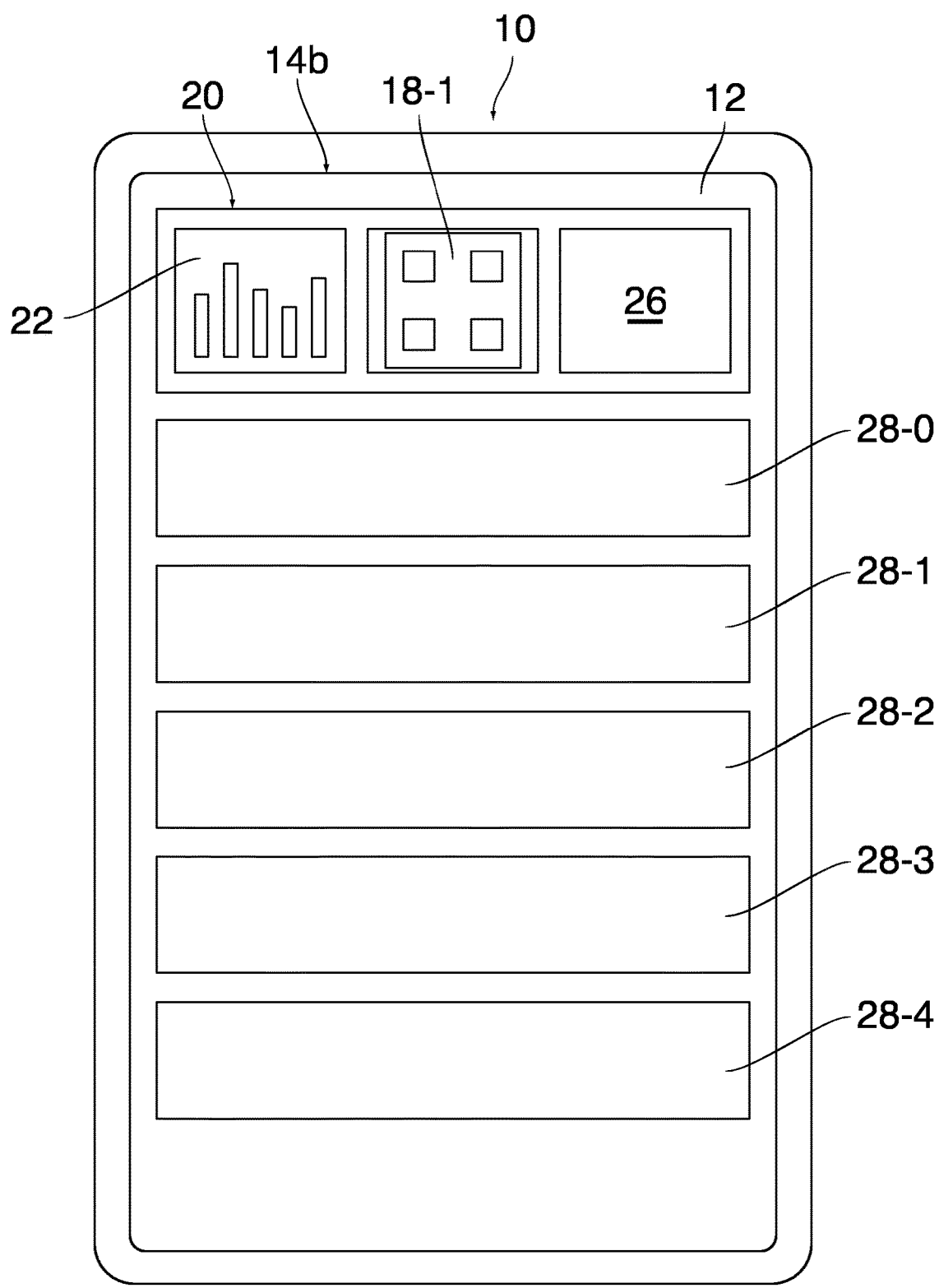
FIG. 5 illustrates the result of the editing operation shown in FIGS. 3 and 4.

It shall now be assumed that, while the display still shows the image frame 14b as in FIG. 5, the print job that has currently been processed (illustrated by display item 18-0 in FIG. 1) has been completed, so that, now, the next print job, illustrated by display item 18-1, moves to the head of the print queue and starts being processed. Consequently, the print job illustrated by display item 18-2 will become the print job to be processed next, and the user may want to make preparations for that print job.

In that situation, the user might switch back to the display screen 14a, select the display item 18-2 and move it into the sub-window 24, i.e. on top of the item 18-1 that has been displayed there. This will automatically have the effect that the display item 18-1 is removed from the summary window 20 and is replaced by the new item 18-2.

Figure 6:
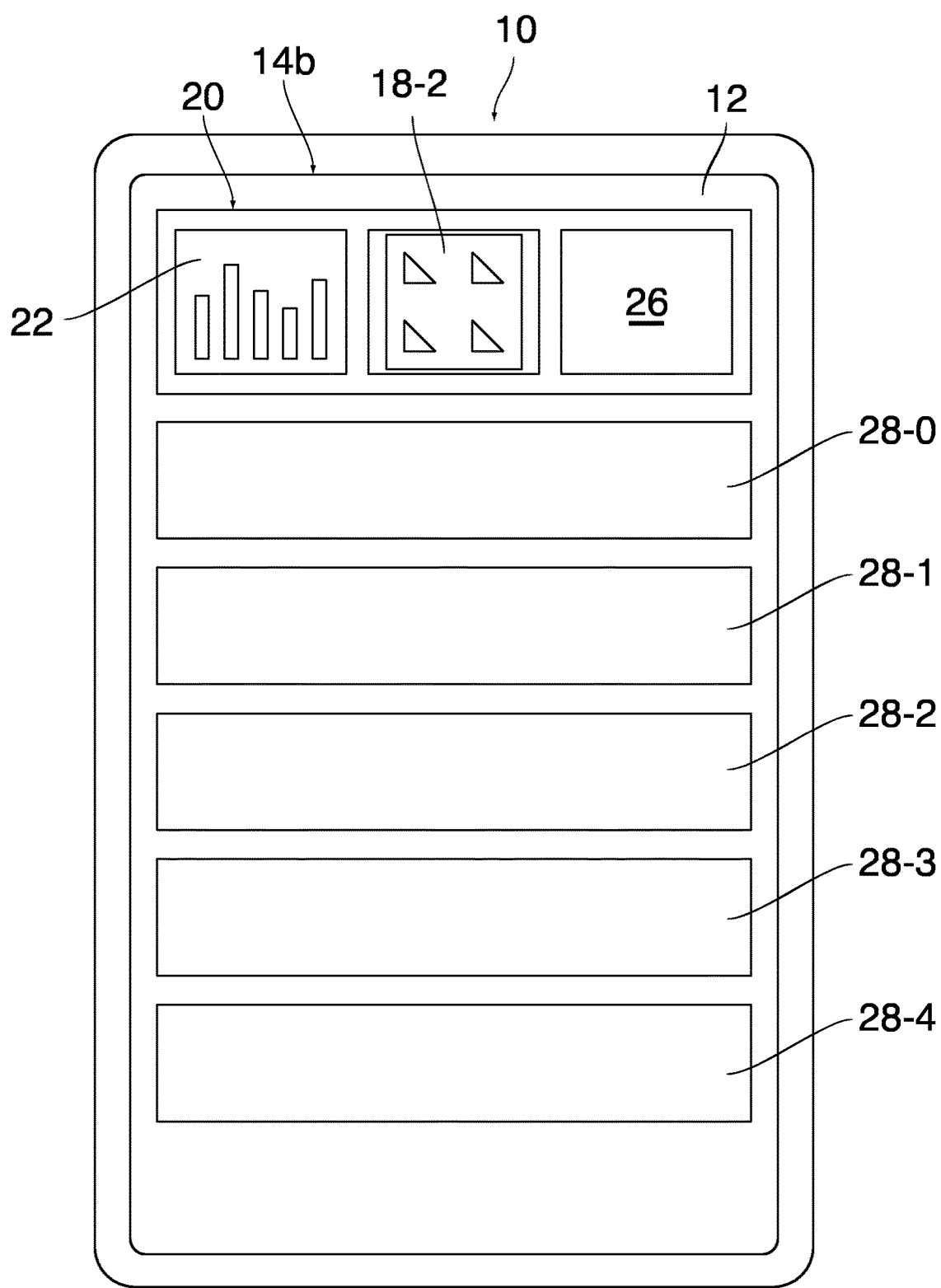
FIG. 6 illustrates the result of the editing operation for the image frame of FIG. 2.

However, in the embodiment described here, the user is relieved even from the burden to switch between the image frames 14a and 14b in this situation. As soon as the print job linked to the display item 18-0 has been completed, the display item 18-1 shown in the sub-window 24 (FIG. 5) is automatically replaced by the display item 18-2, as has been shown in FIG. 6.

Of course, in the situation shown in FIG. 3, the user may also choose to move the display item 18-1 to the sub-window 24 and the display item 18-2 to the empty sub-window 26, so that the previews of two successive print jobs in the print queue are simultaneously visible in the summary window 20. Of course, when one print job has been finished and processing of a next job in the queue starts, the display items in the sub-windows 24 and 26 will automatically change accordingly.

It will be understood that the user interface may comprise display items that are not suitable for being displayed in the summary window 20, e.g. because they are simply too big. Optionally, in any of the image frames 14a-14b, certain icons or frames may be used to mark those display items that are selectable for being permanently shown in the summary window 20.

In some embodiments, it may also be possible that the user moves one of the display items 18-0, 18-1 etc. to the sub-window 22 with the effect that the diagram showing the ink supply condition is removed from the summary window.

Conversely, the user may also actively remove display items from the summary window 20 by dragging them to a position outside of that window.

Figures 7, 8, 9:
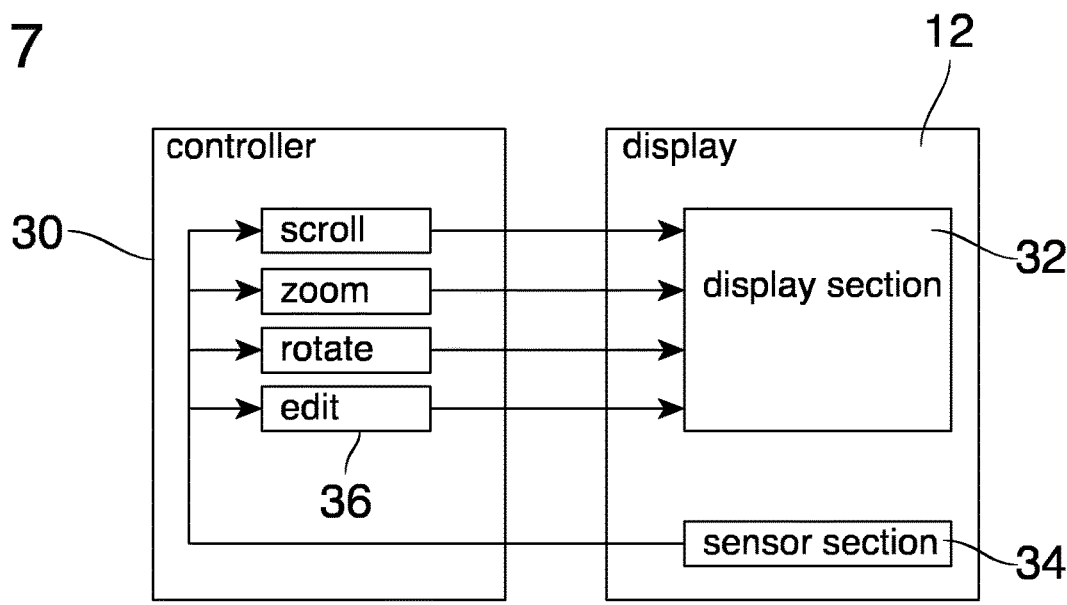
FIG. 7 is a block diagram showing essential components of a user interface according to the invention.
FIG. 8 shows a print queue in a printing system.
FIG. 9 shows a data structure of a display item.

FIG. 7 is a block diagram showing essential elements of a user interface according to the invention. The user interface comprises a controller 30 (implemented in the smartphone 10) and the display 12. The display 12 comprises a display section 32 configured for rendering the visual information on the display, and a sensor section 34 configured for performing the touch-screen function of the display.

The controller 30 is configured for performing the usual functions of scrolling, zooming and rotating the image in accordance with gestures of the user that have been detected by the sensor section 34. Further, the controller 30 includes an edit function 36 which is configured to enable the user to perform—among others—the editing operations that have been described in conjunction with FIGS. 3 to 6.

In operation, the user interface app on the smartphone will receive information from one or more printing systems, the information including the list of print jobs and their current status, and the user may send instructions to the printing systems via the smartphone.

FIG. 8 is a symbolic representation of a print queue comprising print jobs that have been processed or are waiting for being processed on the printer. Each print job is designated by a job number (Job-No.) that varies dynamically in accordance with the progress of the print processing. The print job that is presently being processed on the printer has always the job number "0" whereas the print job to be processed next has job number "1", the next job in the queue has job number "2" and so on. In the example shown, the queue still includes jobs that have recently been processed and are designated by negative job numbers in the order of their processing.

FIG. 9 illustrates a data structure that the controller 30 stores for each display item that may be present in any of the image frames 14a, 14b. This data structure comprises an identifier 38 identifying the display item, a data block 40 storing a current value of at least one content-determining variable x, which variable changes in accordance with changes in the status of the printing system, a content section 42 specifying the contents C(x) of the display item as a function of the content-determining variable x, and an attribute field containing a summary attribute 42 that determines whether or not the display item is to be shown in the summary field 20. In the example shown, the summary attribute may assume not only the logical values "yes" and "no" but also a numerical value from a set of values that the content-determining variable x may assume. If the summary attribute 42 is "yes", this means that the display item is to be shown in the summary window 20 regardless of the value of the variable x (although the contents may change as a function of x). An example would be the display item that is constituted by the bar diagram shown in the sub-window 22. The content-determining variables will in this case be the amounts of inks of the various colors contained in the ink tanks. Consequently, the bar diagram changes dynamically in accordance with the filling states of the ink tanks, but this has no influence on whether or not the diagram is shown in the summary window.

If the summary attributes 42 is "no", this means that the display item is not to be shown in the summary window 20. An example would be the display item 16 in FIG. 1.

If the summary attribute 42 is one of the numerical values that the variable x may assume, then the display item is displayed in the summary window 20 only when the variable x has the value specified in the summary attribute. For example, in case of the display items 18-0 to 18-3, the content-determining variable x would be the job number (FIG. 8). Then, if the summary attribute 42 is "1", this means that the preview (display item 18-1) of a particular print job is shown in the summary window 20 only as long as that particular print job is at the first position in the print queue, i.e. is going to be processed next. As soon as this job is actually being processed, the display item—as identified by the identifier 38—will be removed from the summary window 20, and the display item for the preview of the next job will be shown instead.

Although not shown in FIG. 9, the data structure may comprise an additional data block specifying the location inside the summary window 20 where the display item is to be displayed.

In the given example, the controller 30 is configured such, when the user performs the operations illustrated in FIGS. 3 and 4, this has the effect that the summary attribute 42 changes from "no" to "1" because the selected display item 18-1 is linked to the print job that currently has the job number "1".

The invention claimed is:

1. A dynamic printer user interface for a printing system comprising:
   a display; and
   a print controller configured for displaying image frames with variable contents,
   wherein each image frame includes a selection of display items,
   wherein at least some of the image frames include a summary window displayed at a fixed location on a screen of the display,
   wherein the print controller is configured to assign a summary attribute to at least some of the display items and to display the at least some of the display items in the summary window,
   wherein the print controller has an editing function allowing a user to change a configuration of the image frames,
   wherein the editing function includes a function allowing the user to assign the summary attribute to a display item by dragging the display item into an empty sub-window of the summary window,
   wherein the print controller is configured to store contents to be displayed in a given display item in the form of a function of a contents-determining variable that reflects a status of the system such that the display item is permanently shown in the summary window but the contents of the display item in the summary window change dynamically in accordance with the status of the printing system.

2. The dynamic printer user interface according to claim 1, wherein the summary attribute is a logical variable.

3. The dynamic printer user interface according to claim 1, wherein contents of at least one of the display items is dependent upon a content-determining variable having a value from a predetermined set of values, and the summary attribute has a value from said predetermined set, specifying that the display item is shown in the summary window only on condition that the content-determining variable is identical with the summary attribute.

4. The dynamic printer user interface according to claim 3, wherein the print controller is configured to assign, to the display item which the user drags into the summary window, the value of the content determining variable that this variable has at the time when the related item is being dragged.

5. A software product embodied on a non-transitory computer readable medium and comprising program code which, when loaded into a computer having a display, turns the computer, into the dynamic printer user interface according to claim 1.

6. A printing system comprising the dynamic printer user interface according to claim 1.

7. A printing system comprising the dynamic printer user interface according claim 3, wherein the content determining variable is a job number designating a position of a print job in a print queue.

8. The dynamic printer user interface according to claim 1, wherein the summary window is a display-only window.

* * * * *